US009237510B2

(12) United States Patent
Seo

(10) Patent No.: US 9,237,510 B2

(45) Date of Patent: Jan. 12, 2016

(54) SYSTEM SEARCH METHOD AND MOBILE TERMINAL PERFORMING THE SAME

(75) Inventor: Dong Wan Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1240 days.

(21) Appl. No.: 12/143,544

(22) Filed: Jun. 20, 2008

(65) Prior Publication Data

US 2009/0017818 A1 Jan. 15, 2009

(30) Foreign Application Priority Data

Jul. 12, 2007 (KR) ........................ 10-2007-0070150

(51) Int. Cl.
*H04W 48/16* (2009.01)
*H04W 52/02* (2009.01)

(52) U.S. Cl.
CPC .......... *H04W 48/16* (2013.01); *H04W 52/0258* (2013.01)

(58) Field of Classification Search
CPC . H04W 12/02; H04W 52/50; H04W 72/0446; H04W 52/0216; H04W 4/06; H04W 8/005; H04W 24/00; H04W 48/08; H04W 56/00; H04W 52/0258; Y02B 60/50; G08C 17/00
USPC ............ 455/434, 515, 343.1, 574; 340/539.3, 340/539.13
See application file for complete search history.

(56) References Cited

U.S. PATENT DOCUMENTS 5,794,146 A * 8/1998 Sevcik et al. ................. 455/434
7,313,419 B2 * 12/2007 Islam et al. ....... H04W 52/0245 340/539.3
7,512,424 B2 * 3/2009 Hossain et al. ... H04W 52/0245 340/539.13
8,036,152 B2 * 10/2011 Brown et al. ......... H04W 12/02 370/311
8,311,594 B2 * 11/2012 Islam et al. ....... H04W 52/0245 340/539.13
8,805,876 B2 * 8/2014 Willey ............. H04W 1/72519 455/455
2004/0120278 A1 6/2004 Krantz et al.
2005/0096053 A1 * 5/2005 Liu et al. .............. H04B 17/382 455/439
2006/0023686 A1 * 2/2006 Jeong et al. ........... H04W 48/16 370/338
2006/0068751 A1 * 3/2006 Chandra et al. ...... H04B 1/1615 455/343.2
2006/0184967 A1 * 8/2006 Maynard et al. ... H04N 5/44543 725/46
2006/0189312 A1 * 8/2006 Kubo et al. ....... H04W 52/0241 455/434
2008/0132296 A1 * 6/2008 Willey ................ H04M 1/7259 455/573
2012/0282944 A1 * 11/2012 Zhao et al. ........ H04W 52/0216 455/452.2

FOREIGN PATENT DOCUMENTS

EP 1 610 507 A1 12/2005

* cited by examiner

*Primary Examiner* — Khawar Iqbal
(74) *Attorney, Agent, or Firm* — Jefferson IP Law, LLP

(57) ABSTRACT

A mobile terminal and system search method for the same are provided. The present invention enables a rapid system search with minimized battery consumption after a system loss. The system search method, using a search parameter specifying a first search time $S_0$ and search periods $(D_o+S_1)$ of a wait time $D_o$ and search time $S_1$, includes performing, when the mobile terminal experiences a system loss, an initial system search to search for a system to use for the first search time $S_0$ and increasing, when a system to use is found during the first search time $S_0$, the first search time $S_0$ to reset the search parameter.

14 Claims, 3 Drawing Sheets

START
S51 SET SEARCH PARAMETER {S₀,D₀,Sᵢ}
S53 SYSTEM LOSS ? NO / YES
S55 PERFORM INITIAL SYSTEM SEARCH
S57 SYSTEM FOUND ? NO / YES
S59 FIRST SEARCH TIME S₀ EXPIRED ? NO / YES
S61 $S_0=\min\{S_0+S_c,S_{max}\}$ $D_i=\max\{D_i-D_c,D_{min}\}$
S63 PERFORM SYSTEM SEARCH ACCORDING TO SEARCH PERIOD $(D_i+S_{i+1})$
S65 SYSTEM FOUND ? NO / YES
S67 $S_0=\max\{S_0-\alpha\cdot k\cdot S_c,S_{min}\}$ $D_i=\min\{D_i+\alpha\cdot k\cdot D_c,D_{max}\}$
S69 TERMINATION REQUEST ? NO / YES
END

SYSTEM SEARCH METHOD AND MOBILE TERMINAL PERFORMING THE SAME

PRIORITY

This application claims the benefit under 35 U.S.C. §119 (a) of a Korean patent application filed in the Korean Intellectual Property Office on Jul. 12, 2007 and assigned Serial No. 2007-0070150, the entire disclosure of which is hereby incorporated by reference.

BACKGROUND OF THE INVENTION

1. Field of the Invention

The present invention relates to a system search method in a communication system. More particularly, the present invention relates to a mobile terminal and method for performing a system search that minimizes battery consumption after a system loss.

2. Description of the Related Art

In general, to establish a communication channel, a mobile terminal selects a base station of a mobile communication system for synchronization, and acquires system information from the selected base station. The mobile terminal notifies the base station of its location and registration information using the acquired system information, establishes the communication channel and receives call-related services.

Here, the term "system" refers to a communications infrastructure that is managed by a mobile network operator to provide mobile communication services to mobile terminals. The system may use analog technology, digital cellular technology, Personal Communications Service (PCS) technology and the like.

When a system loss occurs, owing to a loss or failure of the communication channel with a base station, a mobile terminal performs a system search according to a preset system search parameter. That is, the mobile terminal attempts to reestablish the same or another communication channel with a base station by searching for a system. According to the preset system search parameter, the mobile terminal performs an initial system search for a first search time period. If no system is found during the first search time period, the mobile terminal transitions to a power-saving mode (e.g. sleep mode) and then performs a system search for a second search time period. The second search time period corresponds to a preset search period composed of the duration of the power-saving mode and the duration of the system search. This second search time period may be repeated if necessary.

According to a conventional search parameter, the first search time is set to be longer than the second search time. Hence, even if no system is found during the first search time, battery power is still rapidly consumed. Alternatively, if the first search time is set to be shorter, battery power can be saved. However, the system search is more likely to be unsuccessful, and service quality of the mobile communication system can be degraded.

SUMMARY OF THE INVENTION

An aspect of the present invention is to address at least the above-mentioned problems and/or disadvantages and to provide at least the advantages described below. Accordingly, an aspect of the present invention is to provide a mobile terminal and system search method for the same that enable rapid system search with minimized battery consumption after a system loss.

In accordance with an aspect of the present invention, a system search method for a mobile terminal according to a search parameter specifying a first search time $S_0$ and search periods ($D_o$+$S_1$) of a wait time $D_o$ and search time $S_1$ is provided. The method includes performing, when the mobile terminal experiences a system loss, an initial system search to search for a system for the first search time $S_0$, increasing, when a system is found during the first search time $S_0$, the first search time $S_0$ and resetting the search parameter.

In accordance with another aspect of the present invention, a mobile terminal is provided. The mobile terminal includes a wireless communication unit for attempting to connect to a mobile communication system and for receiving system information from a connected mobile communication system, a storage unit for storing a search parameter specifying a first search time $S_0$ and search periods ($D_o$+$S_1$) of a wait time $D_o$ and search time $S_1$, a search section for performing, upon occurrence of system loss, an initial system search to search for a system for the first search time $S_0$ through the wireless communication unit and a first resetter for increasing, when a system to use is found during the first search time $S_0$, the first search time $S_0$ to reset the search parameter.

In accordance with an aspect of the present invention, after a temporary system loss occurs owing to unfavorable conditions of a mobile communication network, the first search time is increased and the wait time is reduced, thereby enabling rapid system recovery with minimized battery consumption.

In addition, when no system is found during the first search time owing to unfavorable conditions of a mobile communication network, the first search time is reduced and the wait time is increased, thereby enabling rapid system recovery with minimized battery consumption.

Thus, according to a success or a failure of the system search during the first search time, the first search time or the wait time is adjusted to enable rapid system recovery with minimized battery consumption.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In the following description, the expression max $\{A_1, A_2\}$ produces the larger one of $A_1$ and $A_2$, and the expression min $\{B_1, B_2\}$ produces the smaller one of $B_1$ and $B_2$.

Figure 1:
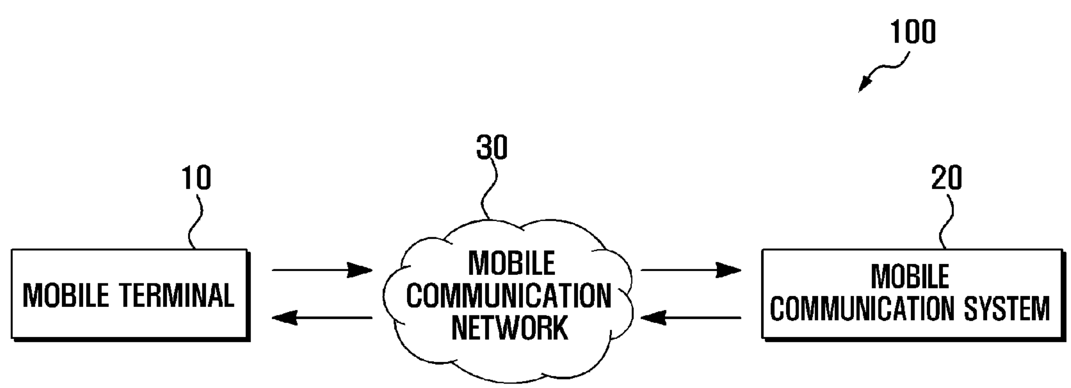
FIG. 1 is a block diagram illustrating interactions between a mobile terminal and a mobile communication system in accordance with an exemplary embodiment of the present invention.

FIG. 1 is a block diagram illustrating interactions between a mobile terminal and a mobile communication system in accordance with an exemplary embodiment of the present invention.

Referring to FIG. 1, a mobile terminal 10 according to an exemplary embodiment of the present invention is connected to a mobile communication system 20 through a mobile communication network 30.

The mobile communication system 20 divides its entire service area into smaller service regions known as cells, which are managed by corresponding base stations. These base stations are then centrally managed by Mobile Switching Centers (MSC) to enable subscribers to make a call while traveling between cells.

The mobile terminal 10 obtains system information through interactions with a base station of the mobile communication system 20, and sends its location and registration information to the mobile communication system 20 using the obtained system information to receive call-related services. That is, the mobile terminal 10 establishes a communication channel with the mobile communication system 20 through a base station.

According to an exemplary implementation, when a system loss occurs owing to failure of the communication channel with the base station, the mobile terminal 10 performs a system search to search for the mobile communication system 20 and to reestablish the communication channel or establish a new communication channel. The system search is performed according to a system search parameter preset at the mobile terminal 10. A default system search parameter is installed in the mobile terminal 10 during the manufacturing process.

Figure 2:
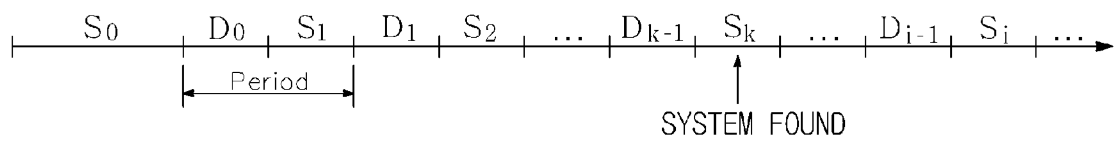
FIG. 2 illustrates a system search parameter in accordance with an exemplary embodiment of the present invention.

The search parameter is given by a combination of search times $S_i$ and wait times $D_i$ (wherein i is a nonnegative integer). As illustrated in FIG. 2, the search parameter includes a first search time $S_0$ and repeating search periods, where each search period $(D_i+S_{i+1})$ is the sum of a wait time $D_i$ and search time $S_{i+1}$. That is, if the mobile communication system 20 is found during the k+1$^{th}$ search time $S_k$, the time required for system search $T_s$ can be given by Equation 1.

$$T_s = \sum_{i=0}^{k} S_i + \sum_{i=0}^{k-1} D_i \quad \text{[Equation 1]}$$

In an exemplary implementation, search times $S_i$ and wait times $D_i$ satisfy the condition given by Equation 2. Of course, this is merely an example and the search and wait times can be varied from each other.

$$S_0>D_0>S_1, S_1=S_2=S_3= \ldots =S_{i+1}, D_0=D_1=D_2= \ldots =D_i \quad \text{[Equation 2]}$$

In an exemplary implementation, the mobile terminal 10 alters the system search parameter according to the results of a system search performed after a system loss.

A system loss may occur for any of several reasons. For example, system loss may occur when conditions of the mobile communication network 30 temporarily deteriorate in an area where the mobile terminal 10 is located. Alternatively, system loss may occur when the mobile terminal 10 is located at a shadow area where signals from the mobile communication network 30 are not readily received. Of course, system loss also occurs when the mobile terminal 10 is powered off.

If a system loss occurs due to temporary deterioration of communication conditions, there is a high probability that a system search will succeed during the first search time $S_0$. In this case, it is preferable to increase the first search time $S_0$ to more rapidly reestablish the channel with the mobile communication system. That is, because of the high probability that the system search will be successful since the deterioration is only temporary, the first search time is extended to avoid entering the wait period. Since the wait period is not entered, the positive search results are achieved more rapidly.

On the other hand, if a system loss occurs due to difficulty of signal reception, such as may occur when the mobile terminal is located in a shadow area, it is unlikely that a system search will succeed during the first search time $S_0$ and it is highly probable that a system search is performed irrespective of the search parameter. In this case, it is preferable to decrease the first search time $S_0$ for saving battery power.

Figure 3:
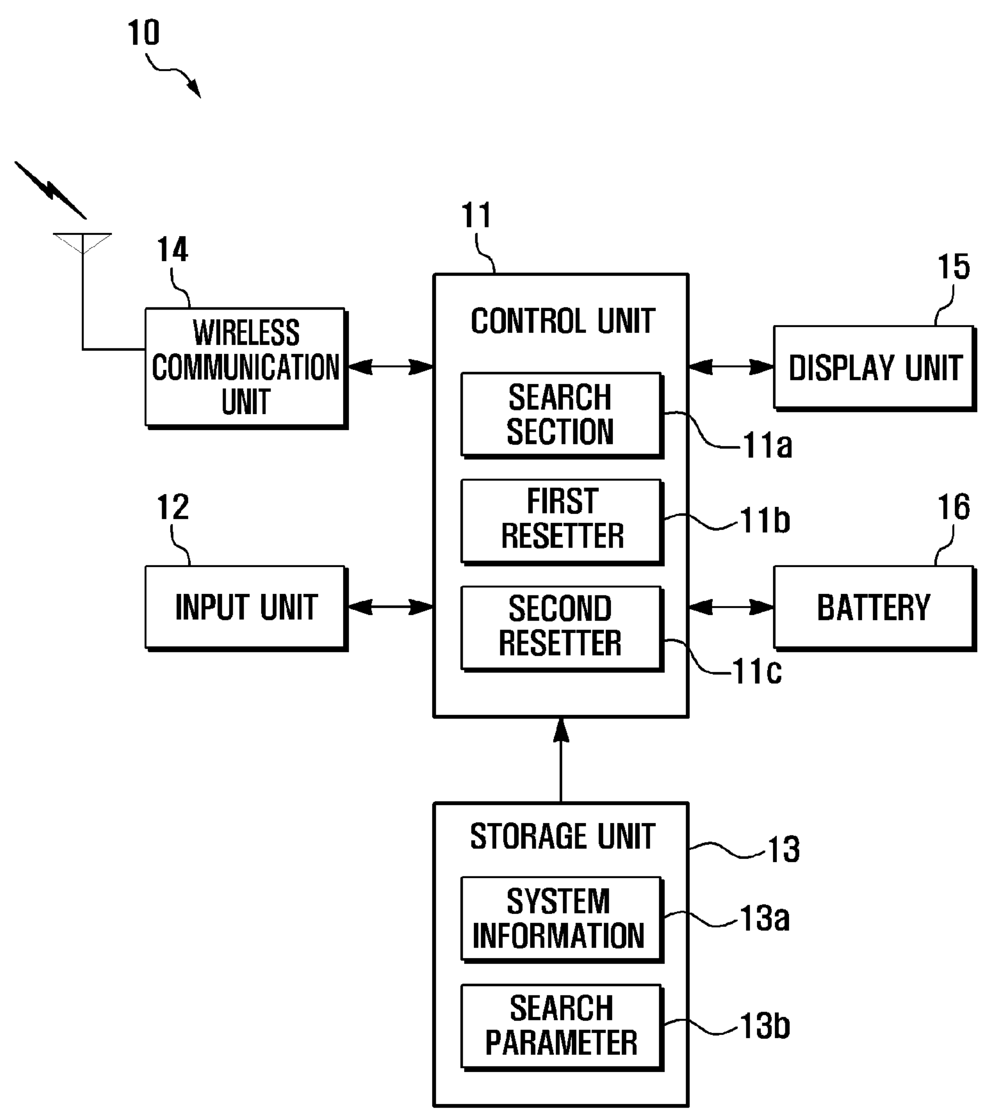
FIG. 3 is a block diagram illustrating a mobile terminal according to an exemplary embodiment of the present invention.

FIG. 3 is a block diagram illustrating a mobile terminal according to an exemplary embodiment of the present invention.

Referring to FIG. 3, a mobile terminal 10 according to an exemplary embodiment of the present invention is described in more detail. The mobile terminal 10 includes a control unit 11, an input unit 12, a storage unit 13, a wireless communication unit 14, a display unit 15, and a battery 16.

The control unit 11 controls the overall operation of the mobile terminal 10. In an exemplary implementation, the control unit 11 performs a system search after failure of a communication channel with the mobile communication system 20, and resets the search parameter depending upon the search result.

The input unit 12 provides a plurality of keys for manipulation of the mobile terminal 10, and sends a selection signal associated with a key selection of the user to the control unit 11. The input unit 12 may include a keypad, a touchpad, a pointing device, a touch screen and the like for input.

The storage unit 13 stores programs necessary for operation and control of the mobile terminal 10. The storage unit 13 also stores data generated from execution of the programs. In particular, the storage unit 13 stores executable programs for performing a system search and for resetting the search parameter according to the search result. The storage unit 13 stores system information 13*a* received from the mobile communication system 20, and the search parameter 13*b*.

The wireless communication unit 14 performs a series of operations related to wireless communication such as the sending and receiving of signals to and from the mobile communication system 20. When performing a system search according to the search parameter, the wireless communication unit 14 attempts to connect to a mobile communication system 20 and obtains system information from the connected mobile communication system 20. In particular, after a system loss, the wireless communication unit 14 performs a system search according to the search parameter to find a mobile communication system 20 and establish or reestablish a communication channel for connection.

The display unit 15 displays various menus associated with functions executed by the mobile terminal 10 as well as information stored in the storage unit 13. The display unit 15 may include a panel of a liquid crystal display device and a touch screen. Use of a touch screen enables the display unit 15 to act simultaneously as a display device and an input device.

The battery 16 supplies necessary power to the elements of the mobile terminal 10.

In more detail, the control unit 11 includes a search section 11*a* for performing a system search according to the search parameter 13*b*, and first and second resetters 11*b* and 11*c* to adjust the search parameter according to the search result. The first and second resetters 11*b* and 11*c* update the search parameter 13*b* stored in the storage unit 13 with an adjusted version.

When a system loss occurs, the search section 11*a* performs a system search according to the current search parameter 13*b* stored in the storage unit 13. If the system search is successful, the search section 11*a* receives system information 13*a* from the found mobile communication system 20 and stores the received system information 13*a* in the storage unit 13. The system information 13*a* is received as part of system parameters from a base station of the mobile communication system 20. The system parameters include information on channels, location, System IDentification (SID), and Network IDentification (NID). The system information 13*a* includes data for SID and NID.

When the system search is successful during the first search time $S_0$, the first resetter 11*b* adjusts the search parameter. Specifically, the first resetter 11*b* increases the first search time $S_0$. For example, the first resetter 11*b* increases the first search time $S_0$ by a preset duration $S_c$ to an extent not longer than a maximum search time $S_{max}$. In addition, the first resetter 11*b* decreases wait times $D_i$. For example, the first resetter 11*b* decreases wait times $D_i$ by a preset duration $D_c$ to an extent not shorter than a minimum wait time $D_{min}$. When the system search during the first search time $S_0$ (k=0) is successful, the adjusted search parameter can be given by Equation 3.

$$i=k+1, S_0=\min\{S_0+S_c, S_{max}\}, D_i=\max\{D_i-D_c, D_{min}\} \quad \text{[Equation 3]}$$

In Equation 3, the wait times $D_i$ are the same and $D_i=D_0$.

The reason for adjusting the search parameter by the first resetter 11*b* may be described as follows. A successful system search during the first search time $S_0$ may indicate that the system loss is temporary. Hence, as explained above, to increase the probability of a successful system search as well as achieve the success more rapidly, the first search time $S_0$ is increased and the wait times $D_i$ are decreased. Further, to cope with a possible error in this adjustment or with an abrupt change of communication conditions, the first resetter 11*b* increases the first search time $S_0$ and decreases the wait times $D_i$ in a stepwise manner.

The second resetter 11*c* adjusts the search parameter when the system search during the first search time $S_0$ fails. That is, the second resetter 11*c* decreases the first search time $S_0$ so that the first search time $S_0$ rapidly converges to the minimum search time $S_{min}$. For example, if the mobile communication system 20 is found during the k+1$^{th}$ search time $S_k$, the second resetter 11*c* adjusts the first search time $S_0$ using Equation 4.

$$i=k+1, S_0=\max\{S_0-\alpha\cdot k\cdot S_c, S_{min}\} (\alpha\text{: constant}) \quad \text{[Equation 4]}$$

The adjusted first search time $S_0$ is a function that is proportional to k with a slope of $-\alpha\cdot S_c$, and has a minimum of $S_{min}$. Alternatively, the adjusted first search time $S_0$ may be set to a function proportional to $k^n$ (n: natural number greater than or equal to 1), in which case the adjusted first search time $S_0$ more rapidly converges to the minimum search time $S_{min}$ with increasing n and fixed $\alpha\cdot S_c$.

In addition, the second resetter 11*c* increases the wait time $D_i$ so that it rapidly converges to the maximum wait time $D_{max}$. For example, if the mobile communication system 20 is found during the k+1$^{th}$ search time $S_k$, the second resetter 11*c* adjusts the wait time $D_i$ using Equation 5.

$$i=k+1, D_i=\min\{D_i+\alpha\cdot k\cdot D_c, D_{max}\} (\alpha\text{: constant}) \quad \text{[Equation 5]}$$

The adjusted wait time $D_i$ is a function that is proportional to k with a slope of $\alpha\cdot S_c$, and has a maximum of $D_{max}$. Alternatively, the adjusted wait time $D_i$ may be set to a function proportional to $k^n$ (n: natural number greater than or equal to 1), in which case the adjusted wait time $D_i$ more rapidly converges to the maximum wait time $D_{max}$ with increasing n and fixed $\alpha\cdot S_c$.

The reason for adjusting the search parameter by the second resetter 11*c* may be described as follows. Failure of the system search during the first search time $S_0$ may indicate that the mobile terminal 10 is in a shadow area where signals from the mobile communication system 20 are not readily received. In this case, increasing the first search time $S_0$ or decreasing the wait time $D_i$ may not contribute towards increasing the probability of a successful system search. Instead, an increased first search time $S_0$ may simply cause an increase in battery power consumption without an increased probability of a successful system search during that time. Hence, the second resetter 11*c* adjusts the search parameter so that the first search time $S_0$ and the wait time $D_i$ rapidly converge to the minimum search time $S_{min}$ and maximum wait time $D_{max}$ respectively.

Referring to FIGS. 1 to 4, an exemplary system search method of the mobile terminal 10 is described. A system search method according to an exemplary embodiment of the present invention is performed when the mobile terminal 10 fails in a system search upon power up or when a system loss occurs during a communication service.

Figure 4:
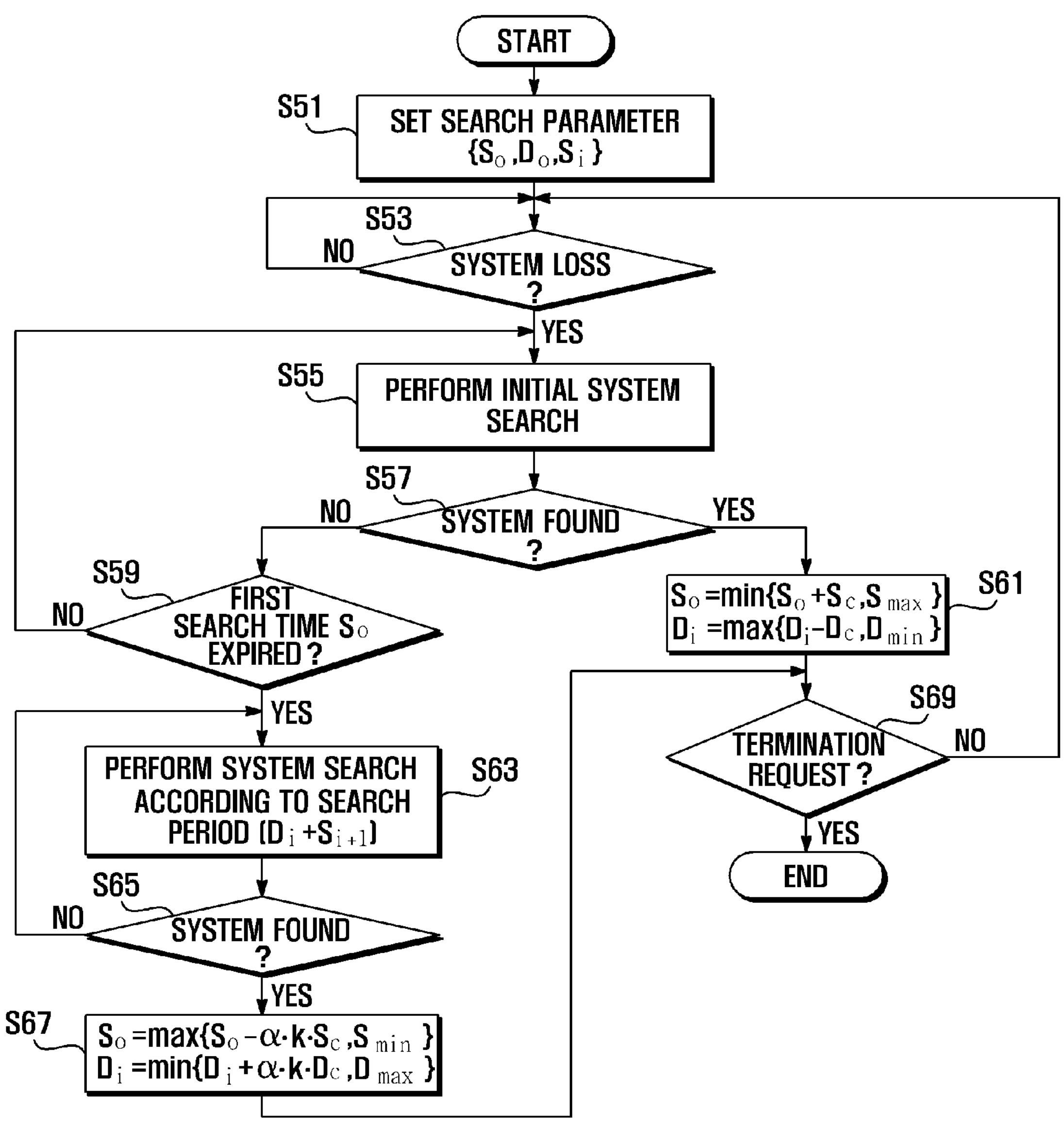
FIG. 4 is a flowchart illustrating a system search method according to an exemplary embodiment of the present invention.

FIG. 4 is a flowchart illustrating a system search method according to an exemplary embodiment of the present invention.

Referring to FIG. 4, the mobile terminal 10 sets the search parameter to satisfy Equation 2 in step S51. The search parameter may be a default version set during the manufacturing process or an updated version of the default version.

The control unit 11 determines whether a system loss occurs in step S53. That is, the control unit 11 determines whether communication with the mobile communication system 20 is interrupted or the communication channel is otherwise disturbed.

If system loss has occurred, the search section 11*a* performs an initial system search according to the set search parameter in step S55.

The search section 11*a* determines the result of the initial system search in step S57.

If no system is found, the search section 11*a* determines whether the first search time $S_0$ has expired in step S59. If the first search time $S_0$ has not expired, the search section 11*a* repeats steps S55 and S57. That is, the initial system search is repeated until expiration of the first search time $S_0$.

If a system is found within the first search time $S_0$, the first resetter 11*b* adjusts the first search time $S_0$ and the wait time $D_i$ using Equation 3 in step S61. That is, the first search time $S_0$ is increased by a preset duration $S_c$ to an extent not longer than the maximum search time $S_{max}$, and the wait time $D_i$ is decreased by a preset duration $D_c$ to an extent not shorter than the minimum wait time $D_{min}$.

The first resetter 11*b* updates the search parameter 13*b* stored in the storage unit 13 using the adjusted search times and wait times. If a system is found, the search section 11*a* receives system information 13*a* from the found mobile communication system 20 and stores the received system information 13*a* in the storage unit 13.

If the first search time $S_0$ has expired at step S59 (i.e. no system is found within the first search time $S_0$), the search section 11*a* transitions to the power-saving mode and performs a system search according to search periods $(D_i+S_i+1)$ in step S63. The search section 11*a* repeats waiting and searching while performing the system search.

The search section 11*a* determines whether a system is found in step S65. If no system is found, the search section 11*a* returns to step S63.

If a system is found during the $k+1^{th}$ search time $S_k$, the second resetter 11*c* adjusts the first search time $S_0$ using Equation 4, and the wait time $D_i$ using Equation 5 in step S67. That is, the first search time $S_0$ is reduced so as to rapidly converge to the minimum search time $S_{min}$, and the wait time $D_i$ is increased so as to rapidly converge to the maximum wait time $D_{max}$.

The second resetter 11*c* updates the search parameter 13*b* stored in the storage unit 13 using the adjusted search times and wait times. If a system is found, the search section 11*a* receives system information 13*a* from the found mobile communication system 20 and stores the received system information 13*a* in the storage unit 13.

The control unit 11 repeats steps S53 to S67 until a termination request is issued in step S69. As described above, when a system loss occurs, the control unit 11 performs a system search according to the updated search parameter. The search parameter is readjusted according to the search result of the system search to achieve success more rapidly as well as saving on battery power.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims and their equivalents.

What is claimed is:

1. A system search method for a mobile terminal according to a search parameter specifying a first search time S0 and search periods (Do+S1) of a wait time Do and search time S1, the system search method comprising:

performing, when the mobile terminal experiences a system loss, an initial system search for the first search time S0;

increasing the first search time S0 and decreasing the wait time Do, when a system is found during the first search time S0; and resetting the search parameter using the first search time S0 and the wait time Do, wherein the increasing of the first search time S0 comprises incrementing the first search time S0 by a preset duration Sc to an extent not longer than a maximum search time Smax, and wherein the decreasing of the wait time D0 comprises decrementing the wait time Do by a preset duration Dc to an extent not shorter than a minimum wait time Dmin.

2. The system search method of claim 1, further comprising decreasing, when a system is not found during the first search time S0, the first search time S0.

3. The system search method of claim 2, wherein the decreasing of the first search time $S_0$ comprises decreasing the first search time $S_0$ to rapidly converge to a minimum search time $S_{min}$.

4. The system search method of claim 3, wherein the decreasing of the first search time $S_0$ resets, when a system is found during a $k+1^{th}$ search time, the first search time $S_0$ to $\max\{S_0-\alpha \cdot k^n \cdot S_c, S_{min}\}$, wherein k comprises a natural number, α comprises a constant and n comprises a natural number.

5. The system search method of claim 4, further comprising increasing the wait time $D_o$.

6. The system search method of claim 5, wherein the increasing of the wait time $D_o$ comprises increasing $D_o$ to rapidly converge to a maximum wait time $D_{max}$.

7. The system search method of claim 6, wherein the increasing of the wait time $D_o$ resets, when a system to use is found during a $k+1^{th}$ search time, the wait time $D_o$ to $\min\{D_o+\alpha \cdot k^n \cdot D_c, D_{max}\}$, wherein α comprises a constant and n comprises a natural number.

8. A mobile terminal comprising:

a wireless communication unit for attempting to connect to a mobile communication system, and for receiving system information from a connected mobile communication system;

a storage unit for storing a search parameter specifying a first search time S0 and search periods (Do+S1) of a wait time Do and search time S1;

a search section for performing, upon occurrence of a system loss, an initial system search to search for a system for the first search time S0 through the wireless communication unit; and a first resetter for increasing the first search time S0 and for decreasing the wait time Do to reset the search parameter, when a system is found during the first search time S0, wherein the first resetter increments the first search time S0 by a preset duration Sc to an extent not longer than a maximum search time Smax, and wherein the first resetter decrements the wait time Do by a preset duration Dc at a time to the extent not shorter than a minimum wait time Dmin.

9. The mobile terminal of claim 8, further comprising a second resetter for decreasing, when a system is not found during the first search time S0, the first search time S0 to reset the search parameter.

10. The mobile terminal of claim 9, wherein the second resetter decreases the first search time $S_0$ so that the first search time $S_0$ rapidly converges to a minimum search time $S_{min}$.

11. The mobile terminal of claim 10, wherein the second resetter resets, when a system is found during a $k+1^{th}$ search time, the first search time $S_0$ to $\max\{S_0-\alpha \cdot k^n \cdot S_c, S_{min}\}$, wherein k comprises a natural number, a comprises a constant and n comprises a natural number.

12. The mobile terminal of claim 11, wherein the second resetter increases the wait time $D_o$.

13. The mobile terminal of claim 12, wherein the second resetter increases the wait time $D_o$ so that the wait time $D_o$ rapidly converges to a maximum wait time $D_{max}$.

14. The mobile terminal of claim 13, wherein the second resetter resets, when a system to use is found during a $k+1^{th}$ search time, the wait time $D_o$ to $\min\{D_o+\alpha \cdot k^n \cdot D_c, D_{max}\}$, wherein α comprises a constant and n comprises a natural number.

* * * * *